United States Patent [19]

Feiring

[11] Patent Number: 5,773,538
[45] Date of Patent: Jun. 30, 1998

[54] PROCESS FOR POLYMERIZATION OF OLEFINIC MONOMERS

[75] Inventor: Andrew Edward Feiring, Wilmington, Del.

[73] Assignee: E. I. du Pont de Nemours and Company, Wilmington, Del.

[21] Appl. No.: 895,598

[22] Filed: Jul. 16, 1997

[51] Int. Cl.$^6$ ............................................. C08F 4/06
[52] U.S. Cl. ........................ 526/146; 526/346; 526/329.7; 526/254
[58] Field of Search .................. 526/146, 94, 346, 526/329.7, 254

[56] References Cited

U.S. PATENT DOCUMENTS 2,776,952  1/1957  Bredereck et al. ...................... 526/146

OTHER PUBLICATIONS

M. Asscher et al, J. Chem. Soc. (1964) pp. 4962–4971.

A. Orochov et al, J. Chem. Soc. (1969), pp. 255–259.

N. Kamigata et al, J. Chem. Soc., Perkin Trans. I (1991) pp. 627–633.

V. Percec et al, Macromolecules, vol. 28, pp. 7970–7972 (1995) and vol. 29, pp. 3665–3668 (1996).

*Primary Examiner*—Joseph L. Schofer
*Assistant Examiner*—N. Sarofim

[57] ABSTRACT

Free radically polymerizable olefinic monomers may be polymerized by using a fluorinated alkyl sulfonyl chloride or bromide and optionally a lower valent metal compound as an initiator system. Monomers such as styrenes, (meth) acrylics, halogenated olefins and vinyl ethers may be polymerized to a variety of thermoplastics or elastomers.

14 Claims, No Drawings

PROCESS FOR POLYMERIZATION OF OLEFINIC MONOMERS

FIELD OF THE INVENTION

Polymerization of free radically polymerizable olefinic monomers may be accomplished by using a fluoroalkylsulfonyl halide and optionally a lower valent metal compound as an initiator system. Monomers such as styrenes, (meth)acrylics, halogenated olefins and vinyl ethers may be polymerized to a variety of thermoplastics or elastomers.

TECHNICAL BACKGROUND

The free radical polymerization of olefinic monomers is an important commercial process, and a wide variety of these monomers, such as styrenes, acrylics, halogenated olefins, vinyl ethers, and others may be homo- or copolymerized. The resultant polymers are useful as molding resins, plastic sheet, film, and elastomers, depending upon the properties of the particular polymer made. Many types of polymerization initiators for these monomers are known, such as peroxides, azonitriles, various redox couples, and others, but virtually all of these have one or more drawbacks. Some are inherently unstable, especially to heat, and/or may produce undesired end groups in the resulting polymers, and/or may only be used under certain conditions such as in aqueous or non-aqueous systems, etc. Therefore new initiation systems for these polymerizations are constantly being sought.

M. Asscher et al., J. Chem. Soc. (1964) p. 4962–4971 report the reaction of various aryl sulfonyl chlorides or alkyl sulfonyl chlorides and copper chloride with various olefins such as styrene. No polymers are reported to be products.

A. Orochov et al., J. Chem. Soc. (1969) p. 255–259 report on the reaction of cupric chloride with an aryl sulfonyl chloride in the presence of styrene. No polymers are reported.

N. Kamigata et al., J. Chem. Soc., Perkin Trans. I (1991) p. 627–633 report on the reaction of perfluoroalkylsulfonyl chlorides with styrene or other olefins in the presence of various transition metal compounds. No polymers are reported as products.

V. Percec et al., Macromolecules, vol. 28, p. 7970–7972 (1995), and V. Percec et al., Macromolecules, vol. 29, p. 3665–3668 (1996) describes the polymerization of styrene in the presence of aryl sulfonyl chlorides and certain transition metal compounds. Alkyl sulfonyl halides are not described as being used in these papers.

SUMMARY OF THE INVENTION

This invention concerns a first polymerization process, comprising, contacting, at a temperature of about 50° C. to about 150° C., a free radically polymerizable olefin with a fluorinated alkyl sulfonyl chloride or bromide and a lower valent metal compound, provided that said fluorinated alkyl sulfonyl chloride or bromide contains more fluorine atoms than hydrogen atoms.

This invention also concerns a second polymerization process, comprising, contacting, at a temperature of about 90° C. to about 200° C., a free radically polymerizable olefin with a fluorinated alkyl sulfonyl chloride or bromide, provided that said fluorinated alkyl sulfonyl chloride or bromide contains more fluorine atoms than hydrogen atoms.

DETAILS OF THE INVENTION

In the processes described herein, a free radically polymerizable olefin is present. Such olefins are well known in the art, see for instance H. Mark et al., Ed., Encyclopedia of Polymer Science and Engineering, 2nd Ed., Vol. 13, John Wiley & Sons, New York, 1988, p. 708–713, and include styrenes, (meth)acrylic-type compounds, various vinyl halides such as vinyl chloride, vinyl fluoride, vinylidene fluoride and tetrafluoroethylene, vinyl ethers such as methyl vinyl ether and perfluoro(methyl vinyl ether), chloroprene, isoprene, vinyl esters such as vinyl acetate, and others. In these polymerizations, only one olefin may be present to form a homopolymer, or more than one olefin may be present to form a copolymer. Some combinations of monomers may not free radically copolymerize while others will copolymerize. Such combinations are also well known in the art. Also, copolymers of olefins which do not readily homopolymerize under free radical conditions may be prepared using a more readily polymerizable monomer. Examples of such monomer combinations include tetrafluoroethylene and hexafluoropropylene, tetrafluoroethylene and ethylene, and tetrafluoroethylene and perfluoro(alkyl vinyl ethers).

By a fluorinated alkyl sulfonyl chloride is meant a compound containing the group —$SO_2Cl$, while a sulfonyl bromide contains the group —$SO_2Br$ (collectively these are sulfonyl halide groups herein). Sulfonyl chlorides are preferred. Each of these compounds may contain more than one sulfonyl chloride or sulfonyl bromide group, although one is preferred. By fluorinated alkyl is meant that each sulfonyl halide group is attached to an alkyl carbon atom, and the alkyl group is fluorinated (another term for this group could be a fluorinated saturated acyclic radical or group) and this group may in fact be an alkyl group, as in normal —$C_nF_{2n+1}SO_2X$, and alkylene group as in $XO_2S(CF_2)_8SO_2X$, a number of alkylene groups as in $XO_2S[CF_2CF(CF_3)O]_4CF_2CF_2SO_2X$ or a trivalent group such as in $FC(CF_2CF_2SO_2X)_3$, wherein X is chlorine or bromine. Other possibilities will be obvious to the artisan. One or more of the sulfonyl halide groups may also be present in a polymer, so the number of carbon atoms in the sulfonyl halide is essentially unlimited. The alkyl group of the fluorinated alkyl group may also be substituted. That is it may contain substituents other than fluorine. Suitable substituents include halogen other than fluorine, ether, aryl group(s), and the like. One or more ether groups is a preferred substituent.

An especially preferred sulfonyl halide is normal —$C_nF_{2n+1}SO_2X$ wherein X is Cl or Br and n is 1 to 20. In another preferred form of the sulfonyl halide, the carbon atom(s) attached directly to the sulfur atom of the sulfonyl halide group(s) is (are) perfluorinated. It is also preferred that the alkyl group of the sulfonyl halide compound be perfluorinated.

By a lower valent metal in the first polymerization process is meant a metal in an oxidation state from which it may change to a higher oxidation state. Usually, such a metal is a transition metal either in the metallic state or as a lower valent compound. Suitable lower valent metals include Ru[II], Sm[II], Cr[II], V[II], Sn[II], Fe[II], Cu[I], Ni[II], Co[II], Cu[0], Ni[0] and Fe[0]. Preferred lower valent metals are Ru[II], Sm[II], Cr[II], V[II], Sn[II], Fe[II], Cu[I], Ni[II], and Cu[I] is more preferred. Metal alloys containing suitable metals may also be used. When metals are used it is unclear whether the metal itself is the active species or whether small amounts of oxidized metal which may be present is the active catalyst. It is preferred that in the initial lower oxidation state of the metal, a one higher oxidation state is available to the metal, for instance M[I]→M[II], or M[II]→M[III], where M is a metal.

The lower valent metal need not be added "directly". It may be formed in situ in the process from either an even lower valent state or a higher valent state. For instance, $CuCl_2$ is reported to form CuCl in the presence of styrene (M. Asscher et al., J. Chem. Soc., (1963), p. 1887), so addition of $CuCl_2$ to a polymerization in which styrene was present would fulfill the requirement for the presence of a lower valent metal.

The first polymerization process is run at a temperature of about 50° C. to about 150° C., preferably about 90° C. to about 120° C. The second polymerization process is run at a temperature of about 90° C. to about 200° C., preferably about 110° C. to about 150° C.

The polymerization processes described herein may be carried out in aqueous or non-aqueous medium. By an aqueous medium is meant a liquid medium that is at least 20 volume percent water, not including the volume of any polymer formed. The aqueous medium may be a dispersion, emulsion, or suspension. The sulfonyl halides described herein, especially those that are perfluorinated, have surprisingly high stabilities in an aqueous medium especially when that medium is neutral or acidic, see for instance Example 12. This allows these compounds to be conveniently used in these polymerizations in an aqueous medium.

A polymerization in a non-aqueous medium includes those in the bulk monomer, when an organic solvent or non-solvent (for one or more components in the polymerization) is present, or in a supercritical fluid which is non-aqueous.

Otherwise both polymerization processes described herein may be carried out using methods known to the artisan, see for instance H. Mark et al., Ed., Encyclopedia of Polymer Science and Engineering, 2nd Ed., Vol. 12, John Wiley & Sons, New York, 1988, p. 504–555. For instance, these polymerizations may be carried out in a batch, semi-batch or continuous manner.

Sometimes the free radical polymerization of olefinic monomers using a fluoroalkylsulfonyl halide and a lower valent metal compound may possess characteristics of so-called "living" or "controlled" polymerization processes. Such processes can lead to polymers with narrow molecular weight distributions, as illustrated in Examples 1, 9 and 10, and may permit formation of block copolymers by sequential addition of polymerizable monomers. For these types of polymerizations, Cu[I] is a preferred low valent metal, and preferred monomers are styrenes and methacrylic-type compounds. The polymers made herein have fluoroalkyl end groups derived from the fluorinated alkyl sulfonyl chloride or bromide. However these end groups do not contain much, if any, sulfur from the sulfonyl halide group. The other end of the polymer chain may have a halide, such as chloro or bromo, end group.

In the Examples, the following abbreviations are used:
DSC—Differential Scanning Calorimetry
GPC—Gel Permeation Chromatography
Mn—number average molecular weight
Mw—weight average molecular weight
P/D—Mw/Mn
THF—tetrahydrofuran Herein melting points measured by DSC were determined at a heating rate of 20° C./min., and the melting point was taken as the peak of the melting endotherm. GPC results are relative to a polystyrene standard.

EXPERIMENT 1

Synthesis of Perfluorobutanesulfonyl Chloride

1-Iodoperfluorobutane (934 g, 2.7 mol) was added dropwise over 1.5 hr to a stirred, deoxygenated mixture of 800 mL of water, 375 mL acetonitrile, 236 g of sodium bicarbonate and 505 g of sodium dithionite at 28° C. This mixture was stirred at room temperature for 24 hr, warmed to 40°–45° C. for 1 hr, then cooled to 0° C. A precipitate was collected by filtration under nitrogen and washed with 100 mL of cold 1:1 acetonitrile:water giving 184 g of sodium perfluorobutanesulfinate as a white powder. The filtrate was diluted with 1-L deoxygenated ethyl acetate. The organic layer was separated, washed with 100 mL brine and evaporated to dryness to 100° C. The residue was recrystallized from isopropanol to give an additional 648 g of product as a white solid. The total yield was 832 g (100%). A 316 g portion of this product was dissolved in 250 mL of water and 50 mL concentrated sulfuric acid and extracted with 3×100 mL of ether. The combined ether extracts were washed with brine and concentrated under reduced pressure. The residue was distilled through an 46 cm column giving 276.6 g of n-perfluorobutanesulfinic acid, bp 67°–73° C. at 133 Pa. $^{19}F$ NMR ($CDCl_3$) −81.6 (3F), −126.7 (2F), −122.7 (2F), −123.0 (2F).

A 92.2 g portion of the above sulfinic acid was added to 100 mL of deoxygenated water at 8°–12° C. and chlorine bubbled through the solution. A lower layer which formed was collected, dried over anhydrous magnesium sulfate and distilled through a 46 cm column giving 62.4 g of n-perfluorobutanesulfonyl chloride, bp 105° C. $^{19}F$ NMR ($CDCl_3$) −81.2(3F), −126.3 (2F), −120.6 (2F), −104.9 (2F).

EXPERIMENT 2

Synthesis of n-Perfluorooctanesulfonyl Chloride

Sodium n-perfluorooctanesulfinate, prepared in a similar manner to the butanesulfinate described above, (50.6 g) was slurried in 125 mL of deoxygenated water and chlorine gas was passed into this mixture yielding a solid mass. An additional 125 mL deoxygenated water and 125 mL of 1,1,2-trichlorotrifluoroethane were added while the chlorine addition was continued until two distinct layers with no solid were formed. The layers were separated and the organic layer was concentrated on a rotary evaporator. The residue was distilled in a Kugelrohr apparatus at 80° C. and 1300 Pa into a dry ice cooled receiver giving 47.7 g of product as a white solid, mp 37°–38° C. $^{19}F$ NMR ($CDCl_3$) −81.6 (3F), −126.7 (2F), −123.2 (2F), −122.2 (2F), −122.0 (2F), −121.9 (2F), −119.6 (2F), −104.8 (2F).

EXAMPLE 1

Polymerization of Styrene Using Perfluorobutanesulfonyl Chloride and Cuprous Chloride A clean, dry 15 mL glass polymer tube was charged with 0.10 g cuprous chloride, 0.156 g 2,2'-bipyridine, 5.2 g (50 mmol) of purified styrene and 0.32 g (1 mmol) of n-perfluorobutanesulfonyl chloride. The resulting mixture was subjected to 4 freeze/thaw cycles and sealed under vacuum. The tube was shaken and then immersed in an oil bath at 120° C. for 20 hr. The tube was cooled and opened and the viscous syrup was dissolved in THF. The THF solution was passed through 5 g of silica gel to remove metallic residues and poured slowly into 300 mL of methanol. The white polymer was collected and dried under vacuum at 90° C. giving 4.90 g of product. $^{19}F$ NMR (THF) −81.2 (3F), −125.8 (2F), −124.2 (2F), −112.2 (2F). GPC analysis (THF) Mw 10000, Mn 7260, P/D 1.38. Anal. Found: C, 88.90; H, 7.27; Cl, 0.65, F, 3.13; S, 0.10. The presence of fluorine in the elemental analysis and the F NMR spectrum confirm the presence of $C_4F_9$ end groups.

EXAMPLES 2–8

Polymerization of Styrene Using Perfluorobutanesulfonyl Chloride

The procedure of Example 1 was essentially repeated using no catalyst or using various metallic species in place of the cuprous chloride and bipyridine. The amount of catalyst used was one-half that of the perfluorobutanesulfonyl chloride on a molar basis. Results are summarized in Table 1.

TABLE 1

| | | Polymer Characterization | | | | |
|---|---|---|---|---|---|---|
| Example | Catalyst | Yield | % F | Mn | Mw | P/D |
| 2 | None | 80% | 2.26 | 91800 | 257000 | 2.81 |
| 3 | $CpRu(CH_3CN)_3OSO_2CF_3$ | 46% | — | 13400 | 27100 | 2.01 |
| 4 | $SmCl_2$ | 78% | 0.52 | 58500 | 146000 | 2.49 |
| 5 | $CrCl_2$ | 68% | 0.74 | 58400 | 158000 | 2.70 |
| 6 | $VCl_2$ | 72% | 0.97 | 39000 | 79600 | 2.04 |
| 7 | $SnCl_2$ | 61% | 1.10 | 3839 | 9200 | 2.40 |
| 8 | $FeCl_2$ | 58% | 1.31 | 3180 | 5230 | 1.64 |

EXAMPLE 9

Polymerization of Styrene Using Perfluorooctanesulfonyl Chloride and Cuprous Chloride The procedure of Example 1 was followed using 0.52 g (1 mmol) of n-perfluoroctanesulfonyl chloride in place of the n-perfluorobutanesulfonyl chloride. After precipitation and drying, 4.72 g of polymer was isolated. $^{19}$F NMR (THF) −81.1 (3F), −126.3 (2F), −123.5 (2F), −122.9 (2F), −122.0 (4F), −121.7 (2F), −112.3 (2F). GPC analysis (THF) Mw 13300, Mn 10100, P/D 1.31. Anal. Found: C, 87.72; H, 7.09; Cl, 0.30, F, 5.70; S, 950 ppm.

EXAMPLE 10

Polymerization of Styrene Using Perfluorobutanesulfonyl Chloride and Cuprous Chloride The procedure of Example 1 was followed using 2.08 g (20 mmol) of styrene, 0.64 g (2 mmol) of n-perfluorobutanesulfonyl chloride, 0.20 g (2 mmol) of cuprous chloride and 0.31 g (2 mmol) of 2,2-bipyridine. After 24 hr at 120° C., the product was dissolved in THF, filtered through a short Florisil® column, and concentrated under vacuum at 55° C. to 2.47 g of white solid. $^{19}$F NMR (benzene-$d_6$) −81.3 (3F), −126.0 (2F), −124.4 (2F), −112.5 (2F). GPC analysis (THF) Mw 3320, Mn 2570, P/D 1.29. Anal. Found: C, 80.50; H, 6.65; Cl, 2.18, F, 10.19; S, 0.29.

EXAMPLE 11

Polymerization of Methyl Methacrylate Using Perfluorooctanesulfonyl Chloride and Cuprous Chloride The procedure of Example 1 was followed using 0.52 g (1 mmol) of n-perfluorooctanesulfonyl chloride, 5.01 g (50 mmol) of purified methyl methacrylate, 0.10 g cuprous chloride and 0.47 g 2,2'-bipyridine. After heating in a 121° C. oil bath for 24 hr, the product was dissolved in THF, passed through a Florisil® column to remove metal salts and concentrated under vacuum to 5.27 g of white solid. GPC analysis (THF) Mw 18400, Mn 11400, P/D 1.61. Anal. Found: C, 59.28; H, 7.24; F, 3.60.

EXAMPLE 12

Preparation of an Aqueous Dispersions of Perfluorobutanesulfonyl Chloride

A solution of 2.41 g of ammonium perfluorononanoate (surfactant) in 1-L of deionized water was processed for 5 minutes through a Microfluidizer™ Model 110T with 4.14 g of n-perfluorobutanesulfonyl chloride. The mixture was cooled by passing though a coil chilled in ice water during the processing. A clear mixture was obtained. A $^{19}$F NMR spectrum on an aliquot of this solution after sitting overnight at room temperature showed peaks at −83.2 (3F), −128.0 (2F), −122.1 (2F) and −106.6 (2F) for the perfluorobutanesulfonyl chloride in addition to peaks for the surfactant. A second aliquot of the solution was heated in an oil bath at 100° C. for 2 hr and then analyzed by $^{19}$F NMR. The spectrum of the n-perfluorobutanesulfonyl chloride was essentially unchanged, confirming stability of this compound in a neutral aqueous mixture. A more concentrated mixture was prepared by adding 10.4 g of n-perfluorobutanesulfonyl chloride to a solution of 0.5 g ammonium perfluorononanoate in 100 mL of deionized water with processing through the Microfluidizer™. A faintly cloudy mixture was obtained which showed the same F NMR spectrum as described above.

EXAMPLE 13

Copolymerization of Tetrafluoroethylene and Hexafluoropropylene Using Perfluorobutanesulfonyl Chloride in Water A 1-L Hastelloy® C autoclave with a stainless steel agitator was flushed with nitrogen and charged with 600 mL of deionized water and 1.45 g of ammonium perfluorononanoate. The reactor was closed, the contents were cooled to about 10° C. and the system was evacuated. Its was pressured to 689 kPa with nitrogen and evacuated twice to remove oxygen from the system. The reactor was then charged with 120 g of hexafluoropropylene and 50 g of tetrafluoroethylene. The reactor contents were heated to 100° C. resulting in an internal pressure of 4.60 MPa. A 25 mL portion of the more concentrated n-perfluorobutanesulfonyl chloride solution in water, prepared in Example 12, was injected over 5 min, resulting in a decrease in internal pressure to 3.10 MPa over the course of 2 hr. The reactor was cooled to room temperature and vented. The contents, a slightly cloudy dispersion with about 0.32 cm of solid on the surface, was frozen with dry ice and allowed to thaw. The resulting mixture was filtered on a nylon cloth. The solid was stirred with about 300 mL water while being heated to about 80° C., filtered and dried overnight in a vacuum oven at 110° C. giving 50.8 g of polymer with a DSC melting temperature of 280.6° C.

EXAMPLE 14

Copolymerization of Tetrafluoroethylene and Hexafluoropropylene Using Perfluorobutanesulfonyl Chloride in Water The procedure of Example 13 was followed, except that the reaction mixture was heated to 65 ° C. prior to injection of the perfluorobutanesulfonyl chloride solution. The initial pressure of 2.99 MPa decreased to 2.08 MPa after injection of the initiator. Polymer (38.2 g) was isolated and had a DSC melting point of 290.8° C.

EXAMPLES 15–22

Copolymerization of Tetrafluoroethylene and Hexafluoropropvlene Using Perfluorobutanesulfonyl Chloride in Water in a Glass Reactor A glass tube about 18 cm long and 4 cm in diameter was charged with 100 mL of an aqueous solution containing 0.22 g of ammonium perfluorooctanoate surfactant, 0.64 g of n-perfluorobutanesulfonyl chloride and the lower valent metal (catalyst), if used. The tube was capped with a ground glass stopper. A small hole, protected by a splash guard, on the side of the tube was present to allow gas to be admitted. The glass tube was loaded into a horizontal stainless steel pressure vessel such that the hole in the glass tube was on the top. The pressure vessel was closed, pressured to 689 kPa nitrogen and vented twice. It was then cooled to about 10° C., evacuated and charged with 50 g of hexafluoropropylene and 25 g of tetrafluoroethylene. The tube was heated to about 108° C. and agitated for 3 hr. It was cooled and vented slowly to atmospheric pressure. The contents of the glass tube were transferred to a plastic bottle, using water to rinse as needed, and frozen in dry ice. After thawing, the mixture was filtered on a nylon cloth. The solid was suspended in about 200 mL of water and heated to about 50° C. with stirring. After cooling the solid was filtered and dried in a vacuum oven at about 120° C. The amount of polymer isolated for each experiment is indicated in Table 2.

TABLE 2

| Example | Catalyst (g) | Polymer Formed, g |
|---|---|---|
| 15 | None | None |
| 16 | Copper wire (0.6) | 13.6 |
| 17 | Hastelloy ® C wire (0.55) | 7.4 |
| 18 | Stainless steel wire (0.66) | 5.9 |
| 19 | CuCl (0.2) | 11.5 |
| 20 | NiCl$_2$ (0.3) | 7.7 |
| 21 | FeCl$_2$ (0.3) | 18.5 |
| 22 | FeSO$_4$.7H$_2$O (0.56) | 14.9 |

EXAMPLE 23

Preparation of a Perfluoropolymer with Pendant Sulfonyl Chloride Groups

A 10.5×64 cm piece of Nafion™ 115 film (lot 18466) (available from E. I. du Pont de Nemours and Company, Wilmington, Del., U.S.A.) in the sulfonic acid form with an equivalent weight of 1070 was immersed in 500 mL of water. Concentrated nitric acid was added and the solution was heated to boiling for one hour to remove contaminants from the film surface. The film was removed and washed with 4×1-L of deionized water. It was immersed in 1-L of deionized water and 20 g of potassium hydroxide pellets and stirred for 68 hr to convert the sulfonic acid groups to the potassium sulfonate form. The film was then rinsed by stirring with 3×1-L deionized water, immersed for 0.5 hr in 1-L boiling water and dried overnight in a vacuum desiccator contained phosphorus pentoxide.

A 1.78 g portion of the above film in three pieces was immersed in a mixture of 40 g of phosphorus oxychloride and 40 g of phosphorus pentachloride under nitrogen. This mixture was heated to115°–120° C. and maintained for 45 hr. The film pieces were removed, rinsed with 2×100 mL of carbon tetrachloride at room temperature and 2×100 mL of boiling carbon tetrachloride and dried in a vacuum oven at about 110° C. Anal.: Found C, 201.8; F, 60.18; S, 3.15; Cl, 1,51. An infrared spectrum of the treated film showed a sharp band at 1427 cm$^{-1}$, the infrared and elemental analyses confirming the presence of sulfonyl chloride groups in the polymer.

EXAMPLE 24

Grafting of Styrene to a Polymer Containing Sulfonyl Chloride Groups

A 0.538 g portion of the polymer film made in Example 23 was immersed in a mixture of 25 mL of toluene and 5.2 g of styrene. Argon was bubbled into this mixture for 1 hr. 2,2'-Dipyridine (0.234 g) and cuprous chloride (0.05 g) were added and the mixture was heated to reflux. After 20 hr the polymer sample was removed, rinsed with toluene and extracted for 1 hr in boiling toluene. It was then extracted in turn with 5% aqueous hydrochloric acid at 60° C., boiling concentrated hydrochloric acid and two portions of boiling concentrated ammonium hydroxide. After rinsing with several portions of water, the polymer sample was dried in a vacuum oven at 105° C. The product polymer was a light green, opaque and somewhat brittle film, in contrast to the clear, colorless, flexible starting film. It weighed 0.823 g, an increase of 0.285 g (53%). A surface infrared spectrum of the film was essentially identical to that of an authentic spectrum of polystyrene. The weight increase and the infrared spectrum confirmed grafting of styrene to the original polymer film.

EXPERIMENT 3

Synthesis of n-Perfluorobutanesulfonyl Bromide

Sodium n-perfluorobutanesulfinate (213.5 g), prepared as described in Experiment 1, was dissolved in 500 mL of deoxygenated water under nitrogen and cooled to 5° C. Bromine (50 mL) was added over 1 hr. This mixture was allowed to warm to room temperature over 1 hr and then heated at 35°–40° C. for 1 hr. It was diluted with an additional 500 mL of water and stirred for 1 hr at 35°–40° C. The mixture was cooled to room temperature and a lower layer was separated. This material was washed with aqueous sodiumthiosulfate solution and water and dried over anhydrous magnesium sulfate giving 233 g of crude product. This was combined with the product from a similar reaction using 28.5 g of sodium n-perfluorobutanesulfinate and distilled through a 15 cm fractionating column giving 192.6 g of product, bp 54° C. at 8.0 kPa. $^{19}$F NMR (CDCl$_3$) −81.1 (3F), −126.4 (2F), −120.7 (2F), −104.4 (2F).

EXAMPLE 25

Grafting of Methyl Methacrylate to a Polymer Containing Sulfonyl Chloride Groups A 0.483 g portion of the polymer film made in Example 23 was immersed in 6.18 g of freshly distilled methyl methacrylate in a polymer tube. This mixture was subjected to 4 freeze/evacuate/thaw cycles and sealed under vacuum. The tube was immersed in an oil bath at 130° C. for 16 hr. The tube was cooled and opened and the block of opaque polymer was extracted 4 times with 250 mL portions of methylene chloride. The insoluble material was dried at 120° C. in a vacuum oven giving 3.2186 g, a weight increase of 2.7356 g (566%). An infrared spectrum of the product showed a strong absorption at 1730 cm$^{-1}$. Anal. Found: C, 52.35; H, 6.60; F, 9.72; S, 0.73.

EXAMPLE 26

Solution Polymerization of Styrene Using Perfluorooctanesulfonyl Chloride and Cuprous Chloride A 100 mL round bottom flask was charged with 5.18 g (0.01 mol) of n-perfluorooctanesulfonyl chloride, 20 mL of toluene and 5.2 g (0.05 mol) of styrene. The solution was bubbled with argon for 1 hr. 2,2'-Bipyridine (2.34 g, 0.015 mol) and cuprous chloride (0.5 g, 0.005 mol) were added. This mixture was heated under argon at 110° C. for 20 hr. The product mixture was passed through a short column of Florisil®, eluting with an additional 125 mL of toluene. The combined toluene solutions were washed with 3×25 mL of 10% aqueous hydrochloric acid and 2×15 mL of water and evaporated to dryness. The solid polymer was dried at 80° C. and 7 Pa giving 7.3 g of product. GPC analysis (THF) Mw 1672, Mn 1436, P/D 1.16. Anal. Found: C, 64.33; H, 4.79; F, 27.62.

EXAMPLE 27

Solution Polymerization of Methyl Methacrylate Using Perfluorobutanesulfonyl Bromide and Cuprous Bromide A 50 mL round bottom flask was charged with 20 mL of toluene. The toluene was bubbled with argon and 5.0 g (50 mmol) methyl methacrylate, 0.156 g (1 mmol) of 2,2'-bipyridine, 0.143 g (1 mmol) of cuprous bromide and 0.36 g (1 mmol) of perfluorobutanesulfonyl bromide were added. The mixture was heated to reflux under argon and maintained overnight. The cooled mixture was passed through a short column of Florisil®, eluting with toluene. The combined toluene solutions were washed with 5% aqueous hydrochloric acid and water and dried over anhydrous magnesium sulfate. The toluene solution was concentrated to about 30 mL and poured into 400 mL of methanol. The precipitated polymer was collected and dried at 100° C. and 13 Pa giving 1.5 g of white solid. GPC analysis (THF) Mw 12300, Mn 12606, P/D 1.13. Anal. Found: C, 59.15; H, 7.65; F, 1.94.

What is claimed is:

1. A polymerization process, comprising, contacting, at a temperature of about 50° C. to about 150° C., a free radically polymerizable olefin with a fluorinated alkyl sulfonyl chloride or bromide and a lower valent metal compound, provided that said fluorinated alkyl sulfonyl chloride or bromide contains more fluorine atoms than hydrogen atoms.

2. A polymerization process, comprising, contacting, at a temperature of about 90° C. to about 200° C., a free radically polymerizable olefin with a fluorinated alkyl sulfonyl chloride or bromide, provided that said fluorinated alkyl sulfonyl chloride or bromide contains more fluorine atoms than hydrogen atoms.

3. The process as recited in claim 1 wherein said temperature is about 90° C. to about 120° C.

4. The process as recited in claim 2 wherein said temperature is about 110° C. to about 150° C.

5. The process as recited in claim 1 or 2 wherein said fluorinated alkyl sulfonyl chloride or bromide has the formula $C_nF_{2n+1}SO_2X$ wherein X is Cl or Br and n is 1 to 20.

6. The process as recited in claim 1 or 2 wherein in said fluorinated alkyl sulfonyl chloride or bromide a carbon atom bound to a sulfur atom of a sulfonyl chloride or bromide group is perfluorinated.

7. The process as recited in claim 1 wherein a metal in said lower valent metal compound is Ru[II], Sm[II], Cr[II], V[II], Sn[II], Fe[II], Cu[I], or Ni[II].

8. The process as recited in claim 1 wherein a metal in said lower valent metal compound is Cu[I].

9. The process as recited in claim 1 wherein said lower valent metal compound is formed in situ in said process.

10. The process as recited in claim 1 wherein an oxidation state of a metal in said lower valent metal compound is one lower than a higher oxidation state of said metal.

11. The process as recited in claim 1 or 2 carried out in an aqueous medium.

12. The process as recited in claim 1 or 2 wherein said fluorinated alkyl sulfonyl chloride or bromide contain one sulfonyl chloride or sulfonyl bromide group.

13. The process as recited in claim 1 or 2 wherein said fluorinated alkyl sulfonyl chloride or bromide is a perfluorinated polymer.

14. The process as recited in claim 1 or 2 wherein said free radically polymerizable olefin is a styrene or a methacrylate-type compound.

* * * * *